United States Patent [19]
Dill et al.

[11] Patent Number: 5,898,548
[45] Date of Patent: Apr. 27, 1999

[54] SHIELDED MAGNETIC TUNNEL JUNCTION MAGNETORESISTIVE READ HEAD

[75] Inventors: Frederick Hayes Dill, South Salem, N.Y.; Robert Edward Fontana, Jr.; Stuart Stephen Papworth Parkin, both of San Jose, Calif.; Ching Hwa Tsang, Sunnyvale, Calif.

[73] Assignee: International Business Machines Corporation, Armonk, N.Y.

[21] Appl. No.: 08/957,787

[22] Filed: Oct. 24, 1997

[51] Int. Cl.⁶ ....................................................... G11B 5/39
[52] U.S. Cl. .............................................................. 360/113
[58] Field of Search .................................... 360/113, 126; 365/173

[56] References Cited

U.S. PATENT DOCUMENTS

| | | | |
|---|---|---|---|
| 5,390,061 | 2/1995 | Nakatani et al. | 360/113 |
| 5,432,734 | 7/1995 | Kawano et al. | 360/113 X |
| 5,629,922 | 5/1997 | Moodera et al. | 369/126 |
| 5,650,958 | 7/1997 | Gallagher et al. | 365/173 |
| 5,712,612 | 1/1998 | Lee et al. | 360/113 X |
| 5,726,837 | 3/1998 | Nakatani et al. | 360/113 |
| 5,729,410 | 3/1998 | Fontana, Jr. et al. | 360/113 |
| 5,747,859 | 5/1998 | Mizushima et al. | 360/113 X |

*Primary Examiner*—John H. Wolff
*Attorney, Agent, or Firm*—Thomas R. Berthold

[57] ABSTRACT

A magnetic tunnel junction (MTJ) magnetoresistive read head for a magnetic recording system has the MTJ device located between two spaced-apart magnetic shields. The magnetic shields, which allow the head to detect individual magnetic transitions from the magnetic recording medium without interference from neighboring transitions, also function as electrical leads for connection of the head to sense circuitry. Electrically conductive spacer layers are located at the top and bottom of the MTJ device and connect the MTJ device to the shields. The thickness of the spacer layers is selected to optimize the spacing between the shields, which is a parameter that controls the linear resolution of the data that can be read from the magnetic recording medium. To reduce the likelihood of electrical shorting between the shields if the shield-to-shield spacing is too small, each of the shields can have a pedestal region with the MTJ device located between the two pedestals, so that the shield-to-shield spacing outside the pedestal regions is greater than in the pedestal regions.

26 Claims, 8 Drawing Sheets

SHIELDED MAGNETIC TUNNEL JUNCTION MAGNETORESISTIVE READ HEAD

RELATED APPLICATION

This application is related to concurrently filed application Ser. No. 08/957,699 titled "MAGNETIC TUNNEL JUNCTION MAGNETORESISTIVE READ HEAD WITH SENSING LAYER AS FLUX GUIDE" and application Ser. No. 08/957,788 titled "MAGNETIC TUNNEL JUNCTION MAGNETORESISTIVE READ HEAD WITH SENSING LAYER AS REAR FLUX GUIDE".

TECHNICAL FIELD

This invention relates in general to magnetic tunnel junction (MTJ) devices, and more particularly to an MTJ device for use as a magnetoresistive (MR) head for reading magnetically-recorded data.

BACKGROUND OF THE INVENTION

A magnetic tunnel junction (MTJ) device is comprised of two ferromagnetic layers separated by a thin insulating tunnel barrier layer and is based on the phenomenon of spin-polarized electron tunneling. One of the ferromagnetic layers has a higher saturation field in one direction of an applied magnetic field, typically due to its higher coercivity than the other ferromagnetic layer. The insulating tunnel barrier layer is thin enough that quantum mechanical tunneling occurs between the ferromagnetic layers. The tunneling phenomenon is electron-spin dependent, making the magnetic response of the MTJ a function of the relative orientations and spin polarizations of the two ferromagnetic layers.

MTJ devices have been proposed primarily as memory cells for solid state memory. The state of the MTJ memory cell is determined by measuring the resistance of the MTJ when a sense current is passed perpendicularly through the MTJ from one ferromagnetic layer to the other. The probability of tunneling of charge carriers across the insulating tunnel barrier layer depends on the relative alignment of the magnetic moments (magnetization directions) of the two ferromagnetic layers. The tunneling current is spin polarized, which means that the electrical current passing from one of the ferromagnetic layers, for example, a layer whose magnetic moment is fixed or prevented from rotation, is predominantly composed of electrons of one spin type (spin up or spin down, depending on the orientation of the magnetic moment of the ferromagnetic layer). The degree of spin polarization of the tunneling current is determined by the electronic band structure of the magnetic material comprising the ferromagnetic layer at the interface of the ferromagnetic layer with the tunnel barrier layer. The first ferromagnetic layer thus acts as a spin filter. The probability of tunneling of the charge carriers depends on the availability of electronic states of the same spin polarization as the spin polarization of the electrical current in the second ferromagnetic layer. Usually, when the magnetic moment of the second ferromagnetic layer is parallel to the magnetic moment of the first ferromagnetic layer, there are more available electronic states than when the magnetic moment of the second ferromagnetic layer is aligned antiparallel to that of the first ferromagnetic layer. Thus, the tunneling probability of the charge carriers is highest when the magnetic moments of both layers are parallel, and is lowest when the magnetic moments are antiparallel. When the moments are arranged neither parallel nor antiparallel, the tunneling probability takes an intermediate value. Thus, the electrical resistance of the MTJ memory cell depends on both the spin polarization of the electrical current and the electronic states in both of the ferromagnetic layers. As a result, the two possible magnetization directions of the ferromagnetic layer whose magnetization direction is not fixed uniquely define two possible bit states (0 or 1) of the memory cell.

A magnetoresistive (MR) sensor detects magnetic field signals through the resistance changes of a sensing element, fabricated of a magnetic material, as a function of the strength and direction of magnetic flux being sensed by the sensing element. Conventional MR sensors, such as those used as a MR read heads for reading data in magnetic recording disk drives, operate on the basis of the anisotropic magnetoresistive (AMR) effect of the bulk magnetic material, which is typically permalloy ($Ni_{81}Fe_{19}$). A component of the read element resistance varies as the square of the cosine of the angle between the magnetization direction in the read element and the direction of sense current through the read element. Recorded data can be read from a magnetic medium, such as the disk in a disk drive, because the external magnetic field from the recorded magnetic medium (the signal field) causes a change in the direction of magnetization in the read element, which in turn causes a change in resistance of the read element and a corresponding change in the sensed current or voltage. In conventional MR read heads, in contrast to MTJ devices, the sense current is in a direction parallel to the ferromagnetic layer of the read element.

The use of an MTJ device as a magnetoresistive read head for magnetic recording is described in U.S. Pat. No. 5,390,061. In this MTJ read head, the electrical sense current to the MTJ device is applied by means of electrical conductors in the form of thin metal layers located above and below the MTJ device. These conductors typically have thicknesses of several hundred Angstroms. Typically the magnetoresistive (MR) read elements are placed between thick highly permeable magnetic layers or shields from which the conductors must be electrically insulated by means of non-electrically conducting layers of sufficient thickness, as shown in FIG. 10 of the '061 patent. For high areal density magnetic recording applications the size of the MR read head and related components have to be decreased as the size of the magnetic bits in which information is stored is decreased. In particular the thickness of the spacing between the magnetic shields, between which the MR read head is typically located, must be reduced in thickness to enable the MR read head to sense magnetic bits with decreased bit lengths. The thickness of the MTJ device and conducting leads and insulating layers cannot be made indefinitely smaller and thus a limit to the maximum possible areal density will eventually be reached. IBM's U.S. Pat. No. 5,729,410 describes an MTJ MR read head with longitudinal biasing wherein the MTJ device has electrical leads that connect to the MR sense circuitry. The leads are in contact with insulating gap material and the gap material is in contact with the magnetic shields so that the leads are electrically insulated from the shields.

What is needed is an MR read head with an MTJ device including its sense leads that can be made sufficiently thin to achieve high areal density by reducing the spacing between the magnetic shields.

SUMMARY OF THE INVENTION

The invention is an MTJ MR read head for a magnetic recording system wherein the MTJ is located between two spaced-apart magnetic shields. The magnetic shields, which allow the head to detect individual magnetic transitions from the magnetic recording medium without interference from neighboring transitions, also function as electrical leads for connection of the head to sense circuitry. Electrically conductive spacer layers are located at the top and bottom of the MTJ and connect the MTJ to the shields. The thickness of the spacer layers is selected to optimize the spacing between the shields, which is a parameter that controls the linear resolution of the data that can be read from the magnetic recording medium. To reduce the likelihood of electrical shorting between the shields if the shield-to-shield spacing is too small, each of the shields can have a pedestal region with the MTJ located between the two pedestals, so that the shield-to-shield spacing outside the pedestal regions is greater than in the pedestal regions.

For a fuller understanding of the nature and advantages of the present invention, reference should be made to the following detailed description taken together with the accompanying figures.

DESCRIPTION OF THE INVENTION
Prior Art

Figure 1:
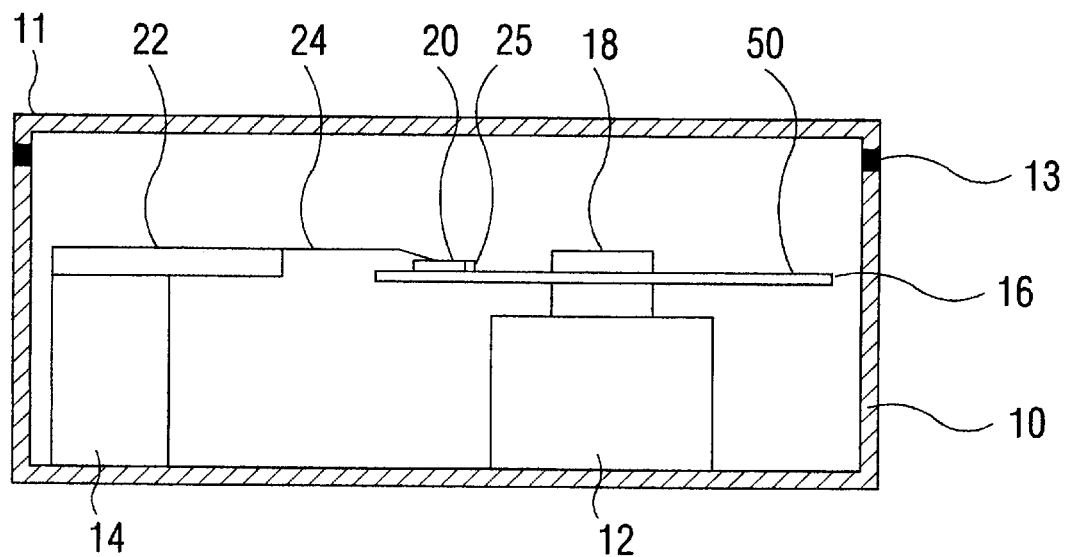
FIG. 1 is a simplified block diagram of a conventional magnetic recording disk drive for use with the recessed MTJ MR read head according to the present invention.

Referring first to FIG. 1, there is illustrated in sectional view a schematic of a prior art disk drive of the type using a MR sensor. The disk drive comprises a base 10 to which are secured a disk drive motor 12 and an actuator 14, and a cover 11. The base 10 and cover 11 provide a substantially sealed housing for the disk drive. Typically, there is a gasket 13 located between base 10 and cover 11 and a small breather port (not shown) for equalizing pressure between the interior of the disk drive and the outside environment. A magnetic recording disk 16 is connected to drive motor 12 by means of hub 18 to which it is attached for rotation by the drive motor 12. A thin lubricant film 50 is maintained on the surface of disk 16. A read/write head or transducer 25 is formed on the trailing end of a head carrier, such as an air-bearing slider 20. Transducer 25 is a read/write head comprising an inductive write head portion and a MR read head portion, as will be described with respect to FIG. 3. The slider 20 is connected to the actuator 14 by means of a rigid arm 22 and a suspension 24. The suspension 24 provides a biasing force which urges the slider 20 onto the surface of the recording disk 16. During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head 25 may access different data tracks on disk 16.

Figure 2:
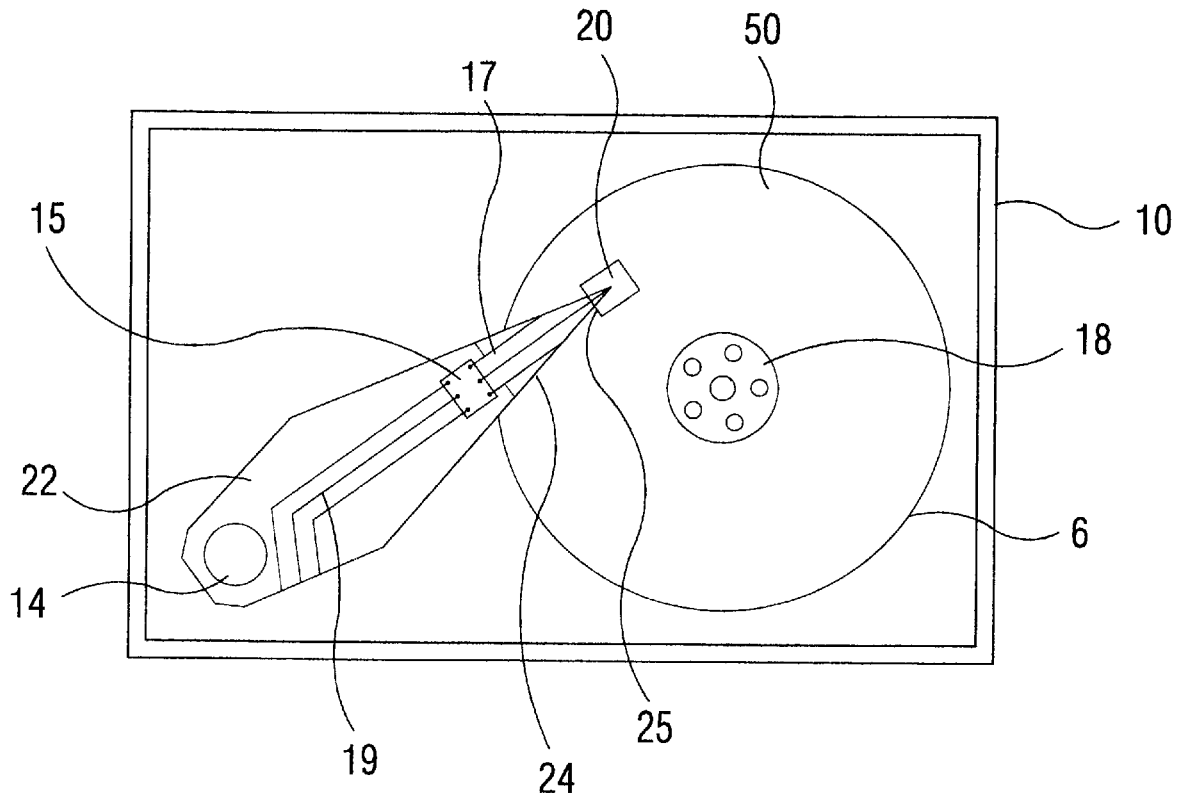
FIG. 2 is a top view of the disk drive of FIG. 1 with the cover removed.

FIG. 2 is a top view of the interior of the disk drive with the cover 11 removed, and illustrates in better detail the suspension 24 which provides a force to the slider 20 to urge it toward the disk 16. The suspension may be a conventional type of suspension, such as the well-known Watrous suspension, as described in IBM's U.S. Pat. No. 4,167,765. This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via flex cable 17 to chip 15, which sends its output signals to the disk drive electronics (not shown) via cable 19.

Figure 3:
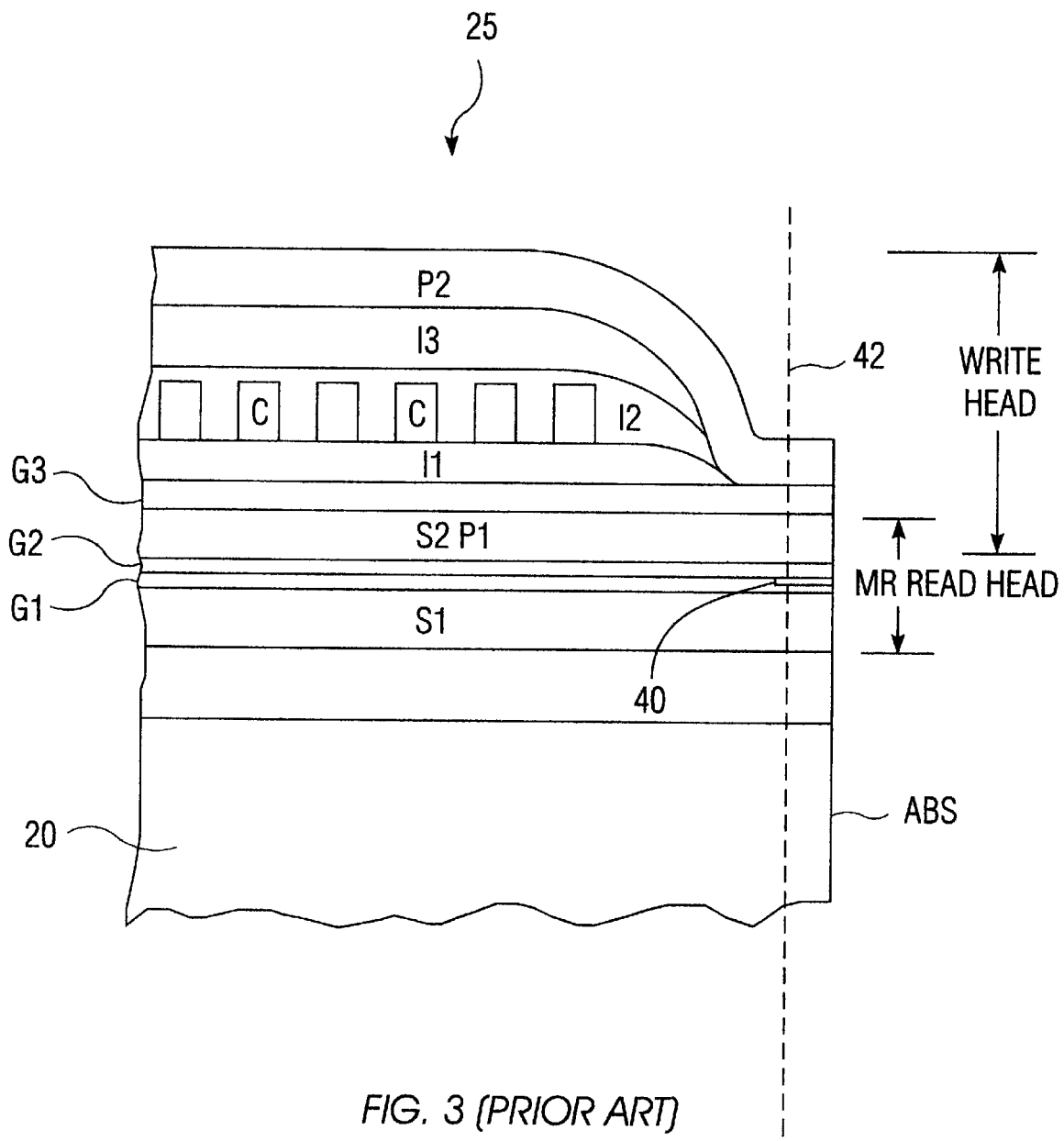
FIG. 3 is a vertical cross-section of a conventional integrated inductive write head/MR read head with the MR read head located between shields and adjacent to the inductive write head for the purpose of illustrating where the MTJ MR read head of the present invention would be located.

FIG. 3 is a cross-sectional schematic view of the integrated read/write head 25 which includes a MR read head portion and an inductive write head portion. The head 25 is lapped to form a sensing surface of the head carrier, such as the air-bearing surface (ABS) of an air-bearing slider type of head carrier. The sensing surface or ABS is spaced from the surface of the rotating disk 16 (FIG. 1) by the air bearing as discussed above. The read head includes a MR sensor 40 sandwiched between first and second gap layers G1 and G2 which are, in turn, sandwiched between first and second magnetic shield layers S1 and S2. The electrical conductors (not shown) that lead out from the MR sensor 40 to connect with sense circuitry in chip 15 (FIG. 2) are in contact with the MR sensor 40 and are located between MR sensor 40 and the gap layers G1, G2. The gap layers G1, G2 thus electrically insulate the electrical leads from the shields S1, S2. In a conventional disk drive, the MR sensor 40 is an AMR sensor. The write head includes a coil layer C and insulation layer 12 which are sandwiched between insulation layers I1 and I3 which are, in turn, sandwiched between first and second pole pieces P1 and P2. A gap layer G3 is sandwiched between the first and second pole pieces P1, P2 at their pole tips adjacent to the ABS for providing a magnetic gap. During writing, signal current is conducted through the coil layer C and flux is induced into the first and second pole layers P1, P2 causing flux to fringe across the pole tips at the ABS. This flux magnetizes circular tracks on the rotating disk 16 during a write operation. During a read operation, magnetized regions on the rotating disk 16 inject flux into the MR sensor 40 of the read head, causing resistance changes in the MR sensor 40. These resistance changes are detected by detecting voltage changes across the MR sensor 40. The voltage changes are processed by the chip 15 (FIG. 2) and drive electronics and converted into user data. The combined head 25 shown in FIG. 3 is a "merged" head in which the second shield layer S2 of the read head is employed as a first pole piece P1 for the write head. In a piggyback head (not shown), the second shield layer S2 and the first pole piece P1 are separate layers.

The above description of a typical magnetic recording disk drive with an AMR read head, and the accompanying FIGS. 1–3, are for representation purposes only. Disk drives may contain a large number of disks and actuators, and each actuator may support a number of sliders. In addition, instead of an air-bearing slider, the head carrier may be one which maintains the head in contact or near contact with the disk, such as in liquid bearing and other contact and near-contact recording disk drives.

Preferred Embodiments

The present invention is a MR read head with an MTJ sensor for use in place of the MR sensor 40 in the read/write head 25 of FIG. 3.

Figure 4A:
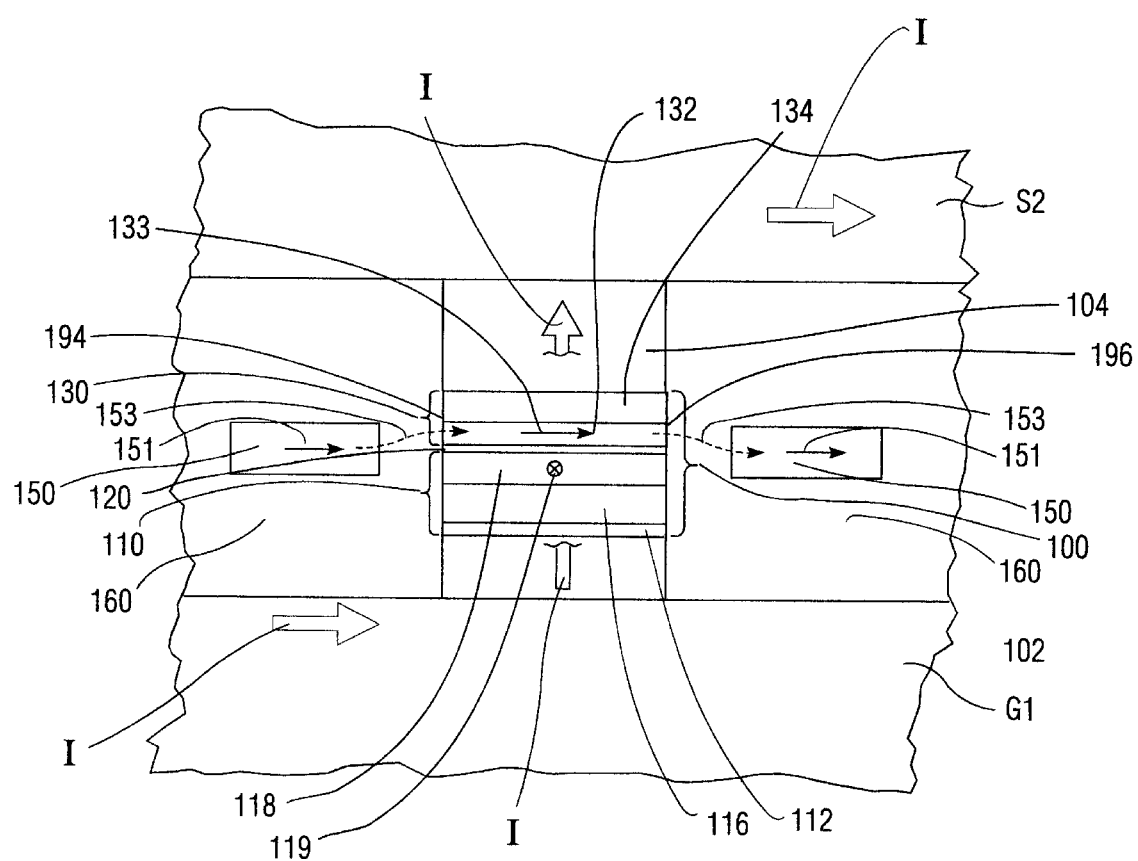
FIG. 4A is a sectional view taken through the MTJ of the MTJ MR read head of the present invention and illustrates the direction of sense current flow through the magnetic shields that serve as electrical leads and perpendicularly through the MTJ.
Figure 4B:
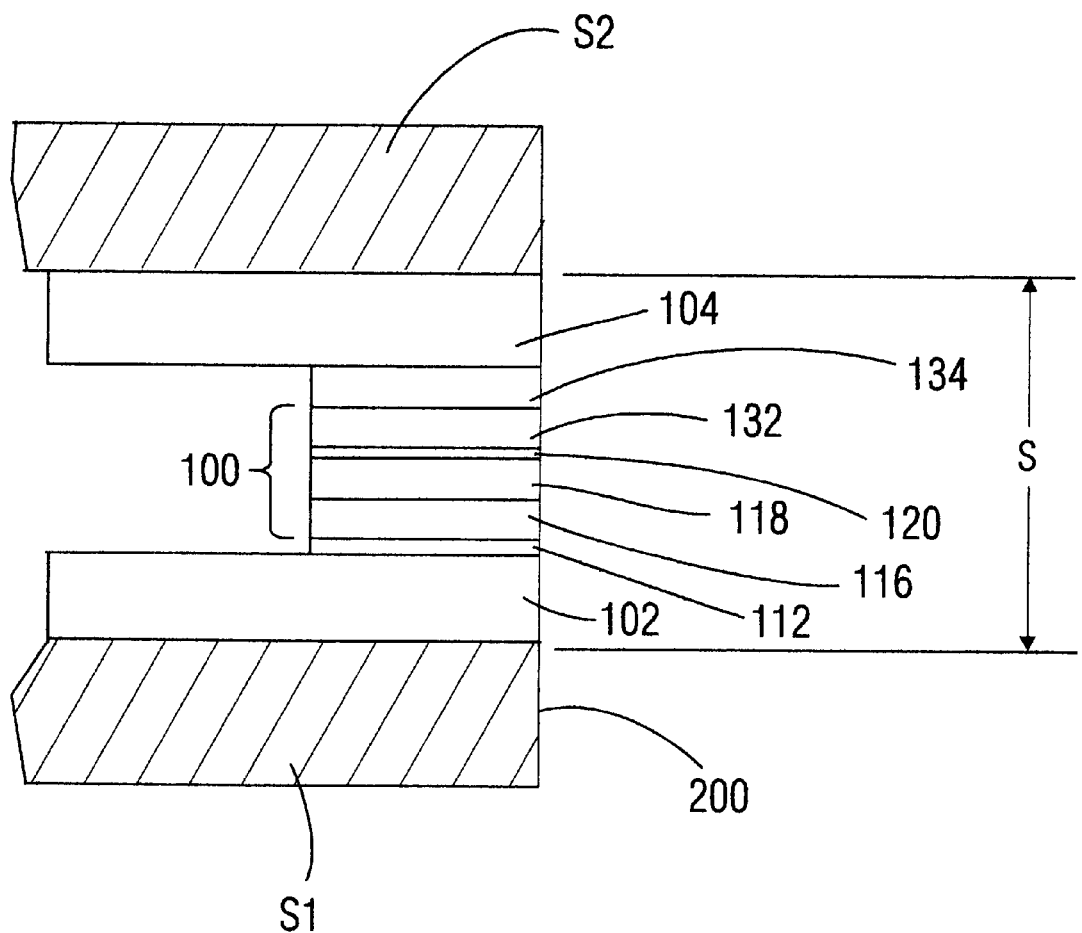
FIG. 4B is a sectional view of the MTJ MR read head of the present invention illustrating the location of the MTJ and other layers relative to the sensing end of the head.

FIG. 4A is a section view of an MTJ MR read head according to one embodiment of the present invention as it would appear if taken through a plane whose edge is shown as line 42 in FIG. 3 and viewed from the disk surface. Thus the paper of FIG. 4A is a plane parallel to the ABS and through substantially the active sensing region, i.e., the tunnel junction, of the MTJ MR read head to reveal the layers that make up the head. FIG. 4B is a section view perpendicular to the view of FIG. 4A and with the sensing surface 200 or ABS to the right.

Referring to FIGS. 4A–4B, the MTJ MR read head includes an electrically conductive spacer layer 102 formed directly on the first magnetic shield S1, an electrically conductive spacer layer 104 below and in direct contact with second magnetic shield S2, and the MTJ 100 formed as a stack of layers between electrical spacer layers 102, 104. The magnetic shields S1, S2 now serve both as magnetic shields and as the electrically conducting leads for connection of the MTJ 100 to sense circuitry. This is shown in FIG. 4A by the arrows showing the direction of current flow through the first shield S1, perpendicularly through spacer layer 102, MTJ 100, spacer layer 104 and out through the second shield S2.

The MTJ 100 includes a first electrode multilayer stack 110, an insulating tunnel barrier layer 120, and a top electrode stack 130. Each of the electrodes includes a ferromagnetic layer in direct contact with tunnel barrier layer 120, i.e., ferromagnetic layers 118 and 132.

The base electrode layer stack 110 formed on spacer layer 102 includes a seed or "template" layer 112 on the spacer layer 102, a layer of antiferromagnetic material 116 on the template layer 112, and a "fixed" ferromagnetic layer 118 formed on and exchange coupled with the underlying antiferromagnetic layer 116. The ferromagnetic layer 118 is called the fixed layer because its magnetic moment or magnetization direction is prevented from rotation in the presence of applied magnetic fields in the desired range of interest. The top electrode stack 130 includes a "free" or "sensing" ferromagnetic layer 132 and a protective or capping layer 134 formed on the sensing layer 132. The sensing ferromagnetic layer 132 is not exchange coupled to an antiferromagnetic layer, and its magnetization direction is thus free to rotate in the presence of applied magnetic fields in the range of interest. The sensing ferromagnetic layer 132 is fabricated so as to have its magnetic moment or magnetization direction (shown by arrow 133) oriented generally parallel to the ABS (the ABS is a plane parallel to the paper in FIG. 4A and is shown as 200 in FIG. 4B) and generally perpendicular to the magnetization direction of the fixed ferromagnetic layer 118 in the absence of an applied magnetic field. The fixed ferromagnetic layer 118 in electrode stack 110 just beneath the tunnel barrier layer 120 has its magnetization direction fixed by interfacial exchange coupling with the immediately underlying antiferromagnetic layer 116, which also forms part of bottom electrode stack 110. The magnetization direction of the fixed ferromagnetic layer 118 is oriented generally perpendicular to the ABS, i.e., out of or into the paper in FIG. 4A (as shown by arrow tail 119).

Also shown in FIG. 4A is a biasing ferromagnetic layer 150 for longitudinally biasing the magnetization of the sensing ferromagnetic layer 132, and an insulating layer 160 separating and isolating the biasing layer 150 from the sensing ferromagnetic layer 132 and the other layers of the MTJ 100. For ease of explanation, the biasing ferromagnetic layer 150 is not shown in FIG. 4B. The biasing ferromagnetic layer 150 is a hard magnetic material, such as a CoPtCr alloy, that has its magnetic moment (shown by arrow 151) aligned in the same direction as the magnetic moment 133 of the sensing ferromagnetic layer 132 in the absence of an applied magnetic field. The insulating layer 160, which is preferably alumina ($Al_2O_3$) or silica ($SiO_2$), has a thickness sufficient to electrically isolate the biasing ferromagnetic layer 150 from the MTJ 100 and the spacer layers 102, 104, but is still thin enough to permit magnetostatic coupling (shown by dashed arrow 153) with the sensing ferromagnetic layer 132. The product M*t (where M is the magnetic moment per unit area of the material in the ferromagnetic layer and t is the thickness of the ferromagnetic layer) of the biasing ferromagnetic layer 150 must be greater than or equal to the M*t of the sensing ferromagnetic layer 132 to assure stable longitudinal biasing. Since the magnetic moment of $Ni_{(100-x)}$—$Fe_{(x)}$ (x being approximately 19) that is typically used in the sensing ferromagnetic layer 132 is about twice that of the magnetic moment of a typical hard magnetic material suitable for the biasing ferromagnetic layer 150, such as $Co_{75}Pt_{13}Cr_{12}$, the thickness of the biasing ferromagnetic layer 150 is at least approximately twice that of the sensing ferromagnetic layer 132.

A sense current I is directed from the electrically conductive material making up the first shield S1 to first spacer layer 102, perpendicularly through the antiferromagnetic layer 116, the fixed ferromagnetic layer 118, the tunnel barrier layer 120, and the sensing ferromagnetic layer 132 and then to second spacer layer 104 and out through second shield S2. As described previously, the amount of tunneling current through the tunnel barrier layer 120 is a function of the relative orientations of the magnetizations of the fixed and sensing ferromagnetic layers 118, 132 that are adjacent to and in contact with the tunnel barrier layer 120. The magnetic field from the recorded data causes the magnetization direction of sensing ferromagnetic layer 132 to rotate away from the direction 133, i.e., either into or out of the paper of FIG. 4A. This changes the relative orientation of the magnetic moments of the ferromagnetic layers 118, 132 and thus the amount of tunneling current, which is reflected as a change in electrical resistance of the MTJ 100. This change in resistance is detected by the disk drive electronics and processed into data read back from the disk. The sense current through shields S1 and S2 is prevented from reaching the biasing ferromagnetic layer 150 by the electrical insulating layer 160, which also insulates the biasing ferromagnetic layer 150 from the MTJ 100 and the spacer layers 102, 104.

A representative set of materials for MTJ 100 (FIGS. 4A–4B) will now be described. All of the layers of the MTJ 100 are grown in the presence of a magnetic field applied parallel to the surface of the substrate. The magnetic field serves to orient the easy axis of all of the ferromagnetic layers. A 5 nm Ta seed layer (not shown) is first formed on a 10–50 nm Culayer that serves as the spacer layer 102. spacer layer materials are those which are electrically conducting but since the spacer layers are very thin there is no stringent requirement on the value of the conductivity. Thus metals much less conducting than Cu can be used provided that they form suitable layers with the appropriate degree of smoothness on which to subsequently grow the various thin layers which comprise the MTJ device 100. An additional requirement for the embodiment shown in FIG. 4A and B is that when in operation the spacer layer material not readily smear across the air bearing surface as a result of occasional contact at the ABS to the magnetic disk. This is not a requirement if the MTJ device and the spacer layers are recessed from the ABS such that the spacer layers would never come in direct contact with the magnetic disk which the MTJ MR head will read. The seed layer is comprised of a material which encourages the (111) growth of the face-centered cubic (fcc) $Ni_{81}Fe_{19}$ template layer 112. The template ferromagnetic layer 112 enhances the growth of the antiferromagnetic layer 116. Suitable seed layer materials include fcc metals, such as Cu, as well as Ta or a combination of layers, such as 3–5 nm Ta/3–5 nm Cu. The MTJ base electrode stack 110 comprises a stack of 4 nm $Ni_{81}Fe_{19}$/ 10 nm $Fe_{50}Mn_{50}$/8 nm $Ni_{81}Fe_{19}$ (layers 112, 116, 118, respectively) grown on the Ta seed layer on the 10–20 nm Cu layer 102. The Cu spacer layer 102 is formed directly on the material forming first shield S1 that serves as the substrate. Next, the tunnel barrier layer 120 is formed by depositing and then plasma oxidizing a 0.5–2 nm Al layer. This creates the $Al_2O_3$ insulating tunnel barrier layer 120. The top electrode stack 130 is a 5 nm Ni—Fe/10 nm Ta stack (layers 132, 134, respectively). The Ta layer 134 serves as a capping layer for protection of the MTJ 100 during processing. The top electrode stack 130 is contacted by a 20 nm Au layer that serves as the spacer layer 104.

It is important that the layers in the bottom electrode stack 110 be smooth, and that the $Al_2O_3$ tunnel barrier layer 120 be free of pinholes which would electrically short the junction. For example, growth by sputtering techniques known to produce good giant magnetoresistance effects in metallic multilayer stacks is sufficient.

An alternative sensing ferromagnetic layer 132 may be comprised of a thin Co or $Co_{(100-x)}Fe_{(x)}$ (x is approximately 70) or $Ni_{(100-x)}Fe_x$ (x is approximately 60) layer at the interface between the sensing ferromagnetic layer 132 and the tunnel barrier layer 120, with the bulk of layer 132 being a low magnetostriction material, such as $Ni_{(100-x)}Fe_x$ (x is approximately 19). The net magnetostriction of this type of sensing layer with a thin Co or $Co_{(100-x)}Fe_{(x)}$ (x is approximately 70) or $Ni_{(100-x)}Fe_x$ (x is approximately 60) interface layer is arranged to have a value close to zero by slight variations of the composition of the bulk of layer 132. An alternative fixed ferromagnetic layer 118 may be comprised largely of a bulk $Ni_{(100-x)}Fe_{(x)}$ (x is approximately 19) layer with a thin layer of a Co or $Co_{(100-x)}Fe_{(x)}$ (x is approximately 70) or $Ni_{(100-x)}Fe_x$ (x is approximately 60) layer at the interface with the tunnel barrier layer 120. The largest signal is obtained with Co or with the highest polarization $Ni_{(100-x)}Fe_x$ (x is approximately 60) or $Co_{(100-x)}Fe_{(x)}$ alloy (x is approximately 70). The interface layer is optimally about 1–2 nm thick. The net magnetostriction of the combined layer is arranged to be close to zero by small variations of the composition. If the bulk of layer 118 is Ni—Fe, then the composition is $Ni_{81}Fe_{19}$, the composition for which bulk Ni—Fe has zero magnetostriction.

The Fe—Mn antiferromagnetic layer 116 may be replaced with a Ni—Mn layer or other suitable antiferromagnetic layer which exchange biases the ferromagnetic material in the fixed layer 118 and which has a resistance which is substantially less than that of the $Al_2O_3$ barrier layer 120. In addition, while in the preferred embodiment the fixed ferromagnetic layer has its magnetic moment fixed by interfacial exchange coupling with an antiferromagnetic layer, the fixed ferromagnetic layer may be formed of a magnetically "hard" high coercivity material, thereby avoiding the need for an antiferromagnetic layer. The hard fixed ferromagnetic layer may thus be formed from a variety of ferromagnetic materials, such as alloys of Co and one or more other elements, including Co—Pt—Cr alloys, Co—Cr—Ta alloys, Co—Cr alloys, Co—Sm alloys, Co—Re alloys, Co—Ru alloys, and Co—Ni—X alloys (X=Pt, Pd, or Cr), as well as a variety of quaternary alloys, such as Co—Ni—Cr—Pt and Co—Pt—Cr—B.

While the MTJ device described and shown in FIGS. 4A–4B has the fixed ferromagnetic layer on the bottom of MTJ 100, the device can also be formed by depositing the sensing ferromagnetic layer first, followed by the tunnel barrier layer, the fixed ferromagnetic layer, and the antiferromagnetic layer. Such an MTJ device would then have the layers essentially inverted from the MTJ 100 shown in FIGS. 4A–4B.

In order to achieve high areal densities (the quantity of data that is stored per unit area of disk surface) the MTJ 100 and its associated spacer layers 102, 104 are placed directly between the magnetic shields S1, S2, as shown in FIGS. 4A–4B, without the need for separate electrical lead layers and insulating gap material to separate the leads from the shields. The magnetic shields, which are comprised of relatively thick highly permeable magnetic layers, allow the MR sensor to detect individual magnetic transitions without interference from neighboring transitions. Thus the MR sensor can detect magnetic bits with smaller bit lengths than otherwise would possible. The resolution of the MR sensor is determined by the separation s between the magnetic shield layers S1 and S2 (see FIG. 4B) and the distance between the sensing surface 200 and the magnetic film on the disk. For example, in order to detect magnetic bits spaced at a linear magnetic bit density of 125,000 bits per inch (equivalent to 5 transitions per micron) in a disk drive with sensor to magnetic film spacing of 0.02 microns, a separation between the shield layers of s ~0.2 microns would be required.

In the present invention the shields S1 and S2 must be electrically conducting and of suitably high magnetic permeability. The shields may be formed from various NiFeX alloys (where X is Ta, Rh, Pt, or Nb) or with CoZrNb alloys or with sendust (FeAlSi) alloys. As shown in FIG. 4B, the present invention allows the separation s to be reduced in thickness by the combined thicknesses of the insulating gap layers G1 and G2 (FIG. 3) which were used to electrically isolate the MR sensor. The spacing s may of course be reduced further in thickness by reducing the thicknesses of the spacer layers 102 and 104. While in principle any resistance in series with the MTJ device will reduce the magnitude of the signal of the MTJ device the resistance of the spacer layers 102 and 104 in the MTJ MR read head of the present invention is negligible.

In the prior art shown in FIG. 3, there is the possibility of electrical shorting of the leads of the MR sensor 40 to the shields S1 and S2 if the gap layers G1 and G2 are made too thin. In the MTJ MR read head of the present invention this problem has been eliminated because the shields now function as the electrical leads to connect the MTJ 100 to sense circuitry.

In the device of the present invention the reduction in the separation between the shields S1, S2 leads to a corresponding increase in the linear resolution of the MTJ MR head. This can be understood by the following example. The thickness of a typical MTJ device 100 is ~66 nm (comprised of layers of 5 nm Ta+15 nm Pt+4 nm $Ni_{81}Fe_{19}$+10 nm $Fe_{50}Mn_{50}$+6 nm $Ni_{81}Fe_{19}$+1 nm $Al_2O_3$+5 nm $Ni_{81}Fe_{19}$+20 nm Ta). Typically the minimum thicknesses of the insulating gap layers G1, G2 may be ~20 nm each. Thus if the MTJ device 100 is used in a structure using the gap layers G1, G2 then the separation between S1 and S2 is ~106 nm. This leads to a linear resolution corresponding to ~250,000 transitions per inch (assuming the bit length is only slightly smaller than the gap separation). When the spacer layers 102, 104 are connected directly to the respective shields S1, S2 the gap layers G1 and G2 are removed and the separation between the shields will be reduced to ~66 nm. The linear resolution of the MR head will thus be increased to ~400,000 transitions per inch. If in addition the thicknesses of the spacer layers 102 and 104 are reduced to ~7.5 nm each, then an even higher resolution of ~500,000 transitions per inch is made possible with otherwise the same MTJ MR device 100. Thus by using the spacer layers 102, 104 and selecting their thicknesses, the spacing distance s can be optimized to design the MTJ MR read head to operate at the desired linear resolution.

The MTJ MR read head of the present invention is suitable for ultra dense magnetic recording applications. Using a structure comprised of 2 nm thick Cu spacer layers 102 and 104, a 5 nm thick IrMn exchange bias layer 116, a 2.5 nm thick Co fixed ferromagnetic layer 118, a 1 nm thick $Al_2O_3$ tunneling barrier 120 and a 3 nm thick free $Ni_{81}Fe_{19}$ free ferromagnetic layer a MTJ device and spacer layers with a combined thicknes of only 13.5 nm thick can be formed. Thus linear densities exceeding 1,500,000 transitions per inch are made possible.

Figure 5:
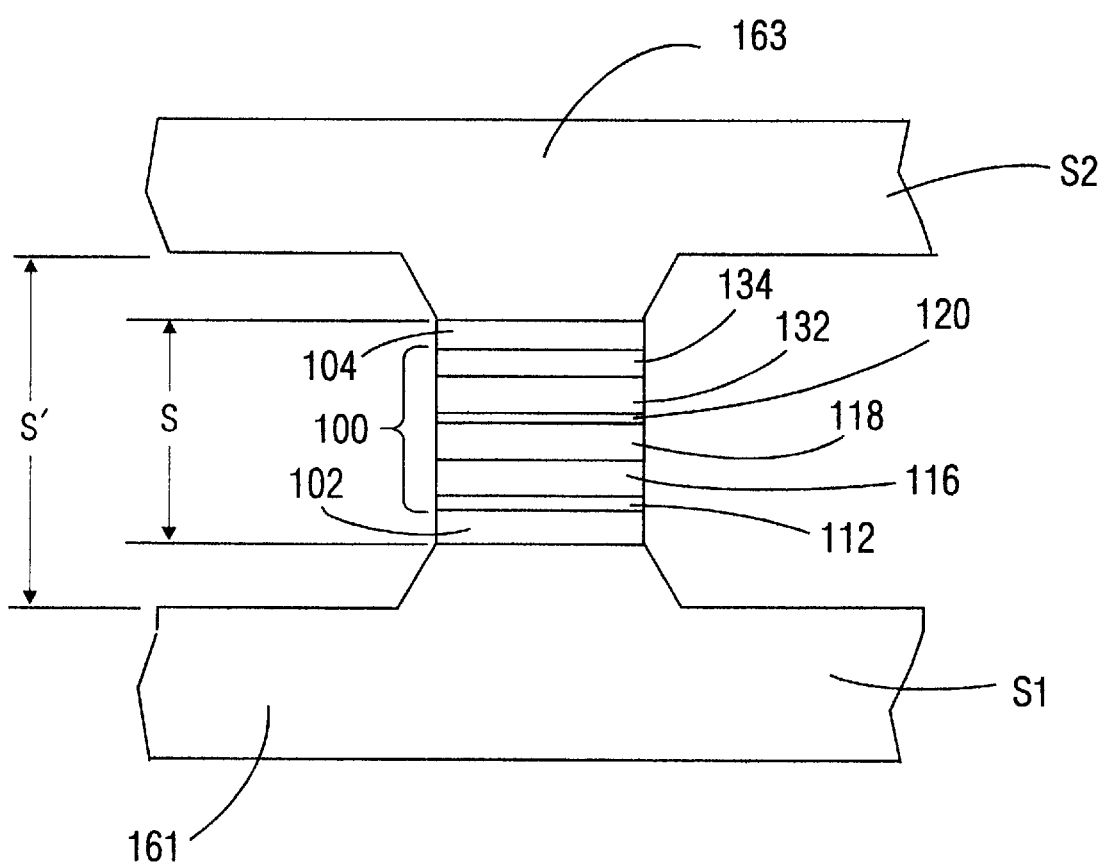
FIG. 5 is a sectional view illustrating an embodiment of the MTJ MR read head of the present invention wherein the MTJ is located between pedestal regions of the magnetic shields.

In the present invention the free ferromagnetic layer 132 can not be in direct contact with the magnetic shield S2 since the magnetic moment of this layer will then be fixed by exchange coupling to the magnetic moment of the shield and thus will not be able to respond optimally to the flux from the magnetic transitions in the magnetic disk medium. Similarly it is preferable that the antiferromagnetic exchange bias layer 116 not be in direct contact with the shield S1 since the magnetic properties of the shield will be altered. In particular the magnetic permeability of the shield will be reduced in the region of the antiferromagnetic layer. Thus the spacer layers 102, 104 provide electrical connection with layers 116, 132, respectively, while isolating these layers from the shields S1,S2. However, it is possible in the present invention that the template layer 112 in contact with the antiferromagnetic layer 116 and the capping layer 134 in contact with the free ferromagnetic layer 132 may serve as spacer layers if made of appropriate materials and formed to suitable thicknesses. For example both the spacer layer 102 and the template 112 may be formed of Ta with a combined thickness of 5–10 nm. Similarly both layers 134 and 104 may be formed from Ta with a combined thickness of 5–10 nm. In the device of the present invention the combined thickness of the MTJ device 100 and the thicknesses of the spacer layers 102, 104 determines the separation distance s. While the device of the present invention eliminates the possibility of electrical shorts between the electrical conducting leads and the shields as the separation of the shields is reduced, the probability of an electrical short directly between the shields increases. This can be alleviated by increasing the separation between the shields in the region away from the MTJ device 100, as shown in FIG. 5. In FIG. 5, each shield S1, S2 has a respective pedestal 161, 163 in the region where the MTJ 100 is formed so that the spacing s in this region can be made smaller than the spacing s' between the shields outside the region where the MTJ 100 is formed. In this manner the larger distance s' decreases the likelihood of an electrical short between the two shields S1, S2.

Another advantage of the MTJ MR read head of the present invention is that the electrical resistance of the shields which now also act as the electrical leads to the MTJ device is small because the shields are very thick. When independent electrical leads to the MTJ device are placed between the shields and the MTJ these leads must be formed from thin conducting layers and separated from the shields by additional insulating layers. For high density recording applications the shield to shield separation s must be kept small which limits the thickness of the electrical leads in the vicinity of the MTJ device. Thus there may be a significant voltage drop across these electrical leads. Since this voltage drop is in series with the desired signal, i.e. the voltage drop across the MTJ device, the output signal is decreased for otherwise the same sense conditions. In the MTJ device of the present invention the voltage drop across the shields which now also act as the electrical leads is small.

Process for Fabricating the MTJ MR Read Head of the Present Invention

Referring to FIGS. 6A–6E, the process for forming the MTJ MR read head of the present invention will be described. A process will be described for forming an MTJ MR head similar to that shown in FIG. 6, where the separation between the magnetic shields is greater in the region away from the MTJ device. For ease of illustration and explanation, the forming of the longitudinal bias regions 150 shown in FIG. 4A will not be described.

Figure 6A:
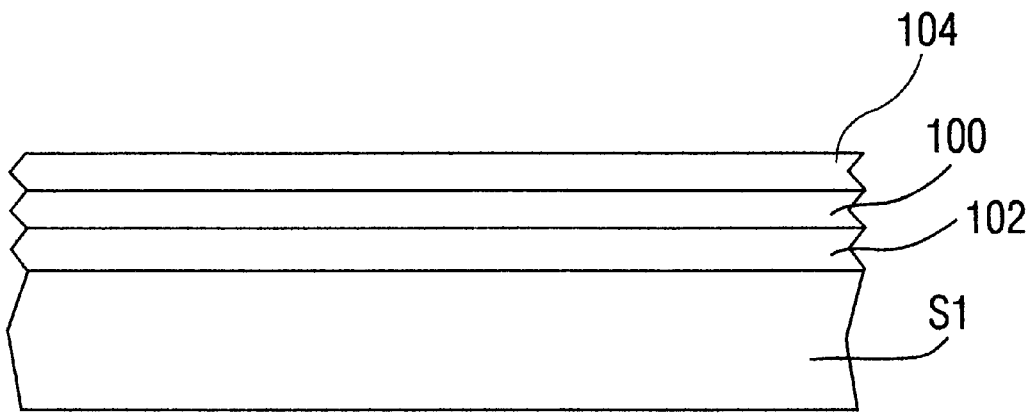
FIGS. 6A–6E illustrate steps in the fabrication of the MTJ MR read head of the present invention.

The process begins, as shown in FIG. 6A, by depositing the material for spacer layer layer 102, the MTJ device 100 and the top spacer layer 104 on top of the shield S1. The spacer layer material 102 can be of a variety of conducting materials, such as Ta, Al, Cu, Au, W and Pt with a typical thickness in the range of 0 to 20 nm. The antiferromagnetic layer 116 can be selected from a variety of well-known materials, such as Fe—Mn, Ni—Mn, Pt—Mn, Ir—Mn and Pd—Mn. The typical thickness for the antiferromagnetic layer 116 is in the range of 7 to 30 nm. The fixed ferromagnetic layer 118 is preferably a Ni—Fe alloy or a bilayer of Ni—Fe alloy and a thin film of Co. Typical thicknesses for the Ni—Fe alloy layer are 2 to 10 nm and typical thicknesses for the Co layer are 0.2 to 2 nm. The thickness of the aluminum the tunnel barrier oxide layer 120 is typically in the range of 0.5 to 1.5 nm. The free ferromagnetic layer 132 is typically a Ni—Fe alloy or a bilayer of Co and a Ni—Fe alloy, with a thickness from 10 to 20 nm for the Ni—Fe alloy and a thickness of 0.2 to 2 nm for the Co. The spacer layer 104 is formed of similar materials and thicknesses as described for the spacer layer 102.

Figure 6B:
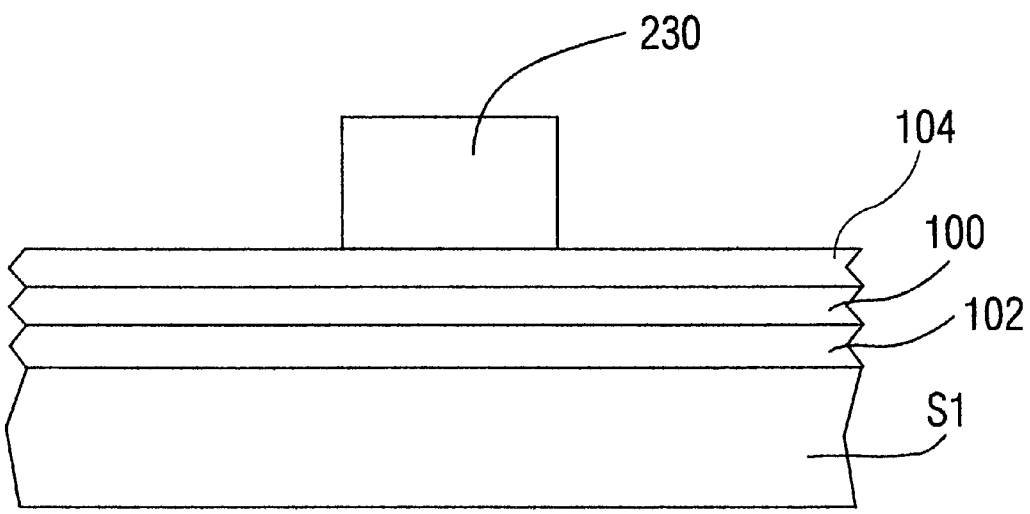
Figure 6C:
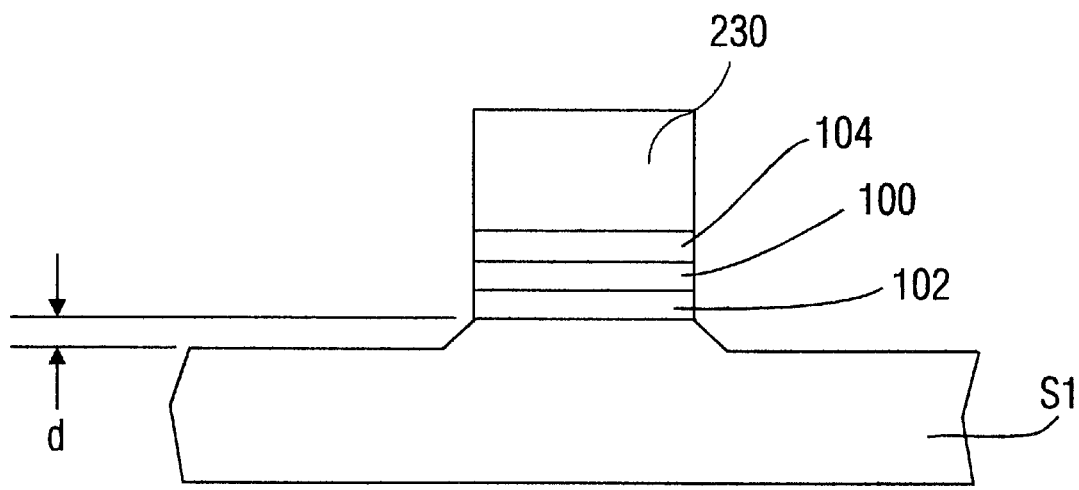
Figure 6D:
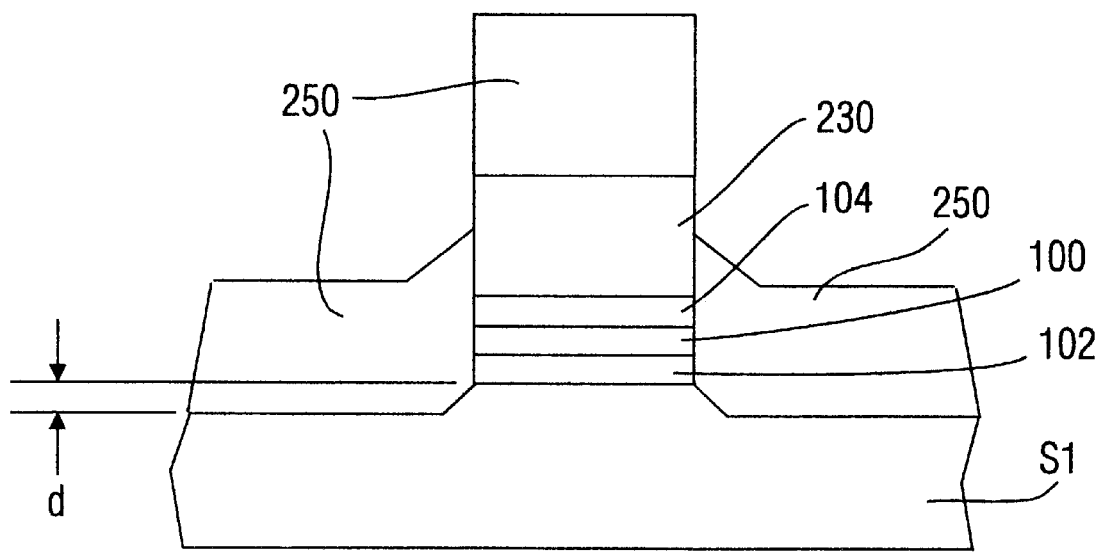
Figure 6E:
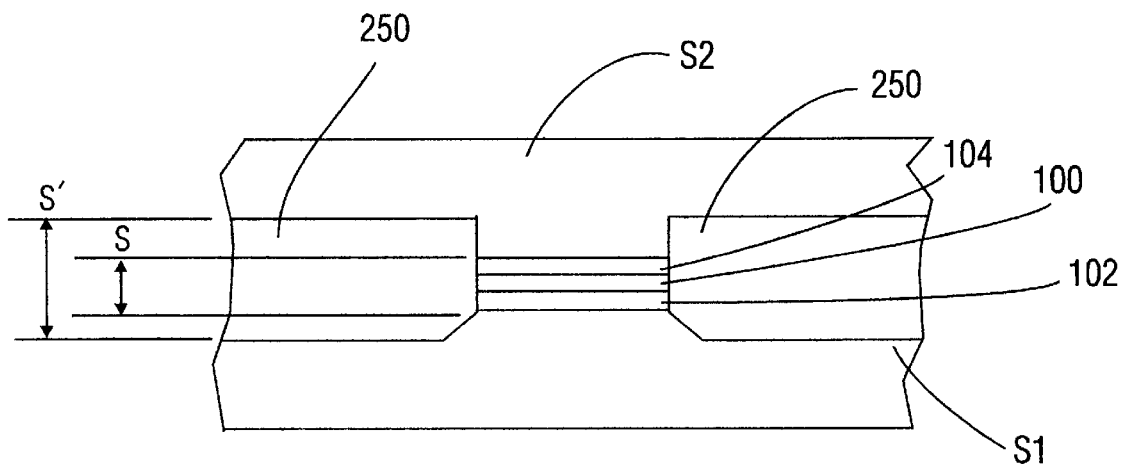

After deposition of these layers, which is usually either by ion beam deposition or RF or DC magnetron sputtering, the layers are lithographically patterned using the resist 230 shown in FIG. 6B. Ion milling then removes material not protected by the resist 230, as shown in FIG. 6C. The ion milling procedure is designed such that by choosing suitable conditions such as the time of the ion milling not only are the layers 102, 100 and 104 removed everywhere there is no resist 230 but in addition material is removed from the the top surface of the bottom shield S1 to a depth d. The resist layer 230 is typically a bilayer resist with an undercut. After the ion milling step of FIG. 6C a layer 250 of insulating material, typically alumina or $SiO_2$, is deposited by ion beam or RF sputtering to a thickness which is greater than at least the sum of d and the thicknesses of the spacer layer 102 and the MTJ device 100 and the spacer layer 104, as shown in FIG. 6D. After the deposition of the insulating layer 250 the resist layer 230 is lifted off, removing the insulating material 250 that was deposited on top of the spacer layer 104. Finally the top shield layer S2 is formed by either ion beam deposition or RF or DC magnetron sputtering, as shown in FIG. 6E.

The above process can also be adapted to provide longitudinal biasing or stabilization for the free ferromagnetic layer 132 by incorporation of the hard magnetic material in regions 150, as shown in FIG. 4A.

The total thickness of the spacer layers, free and fixed ferromagnetic layer, tunnel oxide layer, and antiferromagnetic layer may be in the range 50–80 nm. The lower shield S1 may be overmilled by a thickness d~30 nm and the thickness of the insulating layer deposited in the step of FIG. 6D may be ~120 nm. Thus this example using the fabrication sequence described in FIGS. 6A–6E leads to a MTJ MR read head with a resolution gap s of ~50–80 nm but a shield to shield s' separation away from the MTJ sensor of ~120 nm rather than 50–80 nm. Since it is advantageous to have the free ferromagnetic layer 132 centered in this gap between the two shields (i.e., locating layer 132 at a distance s/2) this is accomplished by adjusting the thicknesses of the spacer layers 102 and 104, the thickness of overmill of S1 and the thickness of the insulating layer 250 deposited in the step of FIG. 6D.

After the definition and fabrication of the MTJ sensor it is still necessary to align the magnetization direction (magnetic moment) of the fixed ferromagnetic layer 118 in the proper direction. If Fe—Mn is used as the antiferromagnetic layer 116 for exchange coupling with the fixed ferromagnetic layer 118 it is antiferromagnetic as deposited. However, its magnetization must be realigned so that it can exchange couple the fixed ferromagnetic layer 118 in the proper orientation. The structure is placed in an annealing oven and the temperature is raised to approximately 180° C., which is greater than the blocking temperature of Fe—Mn. At this temperature, the Fe—Mn layer no longer gives rise to an exchange anisotropy with the fixed ferromagnetic layer 118. An exchange anisotropy of the ferromagnetic layer 118 is developed by cooling the pair of layers 116, 118 in a magnetic field. The orientation of the magnetization of the fixed ferromagnetic layer 118 will be along the direction of the applied magnetic field. The applied magnetic field in the annealing oven thus causes the moment of the fixed ferromagnetic layer 118 to be fixed along the required direction perpendicular to the ABS, as shown by the arrow 119 in FIG. 4A. This is a result of cooling the Fe—Mn layer in the presence of the ferromagnetic layer 118, magnetized by the applied magnetic field, in the required direction. Thus, at temperatures below the blocking temperature of Fe—Mn, in the presence of an applied magnetic field from the recorded medium, the magnetization of the fixed ferromagnetic layer 118 will not substantially rotate.

While the embodiment of the present invention described in FIG. 5 has pedestals 161, 163 of the same area as the area of the MTJ device 100 and aligned with the MTJ device this is not a necessary requirement. In an alternative embodiment the area of the pedestals can be made larger than the area of the MTJ device 100 and the MTJ device does not have to be centered within the pedestals although the boundaries of the MTJ device must lie within the area of the pedestals. Similarly only one pedestal on either side of the MTJ device is required to allow for increased separation of the shields S1, S2 away from the MTJ device. Such an alternative embodiment with only the upper pedestal may be formed by a similar process of fabrication as described in FIGS. 6A–6E. However the MTJ device 100 and spacer layers 102 and 104 are not overmilled as shown in FIG. 6C but are milled through only as far as the surface of the shield S1.

Thus no lower pedestal is formed. The rest of the process is otherwise identical. An embodiment in which only the lower pedestal is formed is fabricated by a similar set of fabrication steps as shown in FIGS. 6A–6E except that except that after removing the photoresist 230 after step FIG. 6D the resulting surface of the device is planarized by a process of chemical mechanical polishing. The shield S2 is then directly deposited on the planarized surface and no upper pedestal is formed.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic tunnel junction magnetoresistive read head for sensing data magnetically recorded on a medium when connected to sense circuitry, the head comprising:

a first magnetic shield formed of electrically conducting and magnetically permeable material;

a first electrically conductive spacer layer located on the first shield;

a magnetic tunnel junction located on the first spacer layer and comprising:

a fixed ferromagnetic layer having its magnetization direction fixed along a preferred direction so as to be substantially prevented from rotation in the presence of an applied magnetic field from the medium;

a sensing ferromagnetic layer having its magnetization direction oriented generally perpendicular to the magnetization direction of the fixed ferromagnetic layer in the absence of an applied magnetic field and being free to rotate in the presence of an applied magnetic field from the medium;

an insulating tunnel barrier layer located between and in contact with the fixed and sensing ferromagnetic layers for permitting tunneling current in a direction generally perpendicular to the fixed and sensing ferromagnetic layers;

a second electrically conductive spacer layer, wherein the magnetic tunnel junction is located between and in contact with the first and second spacer layers; and a second magnetic shield formed of electrically conducting and magnetically permeable material and located on the second spacer layer; whereby an electrically conductive path is provided from the first shield to the first spacer layer and through the magnetic tunnel junction to the second spacer layer and the second shield.

2. The head according to claim 1 further comprising a capping layer for providing corrosion protection for the magnetic tunnel junction, the capping layer being located between the magnetic tunnel junction and the second spacer layer.

3. The head according to claim 1 wherein the second spacer layer is a capping layer for providing corrosion protection for the magnetic tunnel junction.

4. The head according to claim 1 further comprising an antiferromagnetic layer in contact with the fixed ferromagnetic layer for fixing the magnetization direction of the fixed ferromagnetic layer by interfacial exchange coupling.

5. The head according to claim 4 wherein the first spacer layer is formed directly on the first shield, wherein the antiferromagnetic layer is located between the first spacer layer and the fixed ferromagnetic layer, and wherein the fixed ferromagnetic layer is formed directly on and in contact with the antiferromagnetic layer.

6. The head according to claim 5 further comprising a template layer located on the first spacer layer for enhancing the formation of the antiferromagnetic layer, and wherein the antiferromagnetic layer is formed directly on and in contact with the template layer.

7. The head according to claim 5 wherein the first spacer layer is a template layer for enhancing the formation of the antiferromagnetic layer, and wherein the antiferromagnetic layer is formed directly on and in contact with the template layer.

8. The head according to claim 1 further comprising:
a biasing ferromagnetic layer for longitudinally biasing the magnetization direction of the sensing ferromagnetic layer in a direction generally perpendicular to the magnetization direction of the fixed ferromagnetic layer in the absence of an applied magnetic field; and
an electrically insulating layer located between the biasing and sensing ferromagnetic layers for electrically isolating the biasing layer from the sensing layer; and wherein the spacer layers are electrically isolated from the biasing layer by the insulating layer, whereby when a sense current is passed between the first and second shields it passes generally perpendicularly through the magnetic tunnel junction without passing into the biasing layer.

9. The head according to claim 1 wherein the read head is part of an integrated read/write head.

10. The head according to claim 1 further comprising sense circuitry connected to the first and second shields.

11. The head according to claim 1 wherein each of the first and second shields includes a pedestal region, and wherein the first spacer layer is formed on the pedestal region of the first shield and the second spacer layer is formed on the pedestal region of the second shield, whereby the spacing between the first and second shields is greater outside the pedestal regions than at the pedestal regions.

12. The head according to claim 11 wherein the area of each of the pedestal regions is substantially the same as the area of each of the first and second spacer layers.

13. The head according to claim 1 wherein the first and second shields are formed of a material selected from the group consisting of NiFeX alloys (where X is Ta, Rh, Pt, or Nb), CoZrNb alloys, and FeAlSi alloys.

14. The head according to claim 1 wherein the head is the type for sensing data from a magnetic recording disk and further comprising an air-bearing slider having an air-bearing surface (ABS) facing the surface of the disk when data from the disk is being read by the head and a trailing end surface generally perpendicular to the ABS, and wherein the slider trailing end surface is a substrate on which the first shield is formed.

15. A magnetoresistive read head assembly having a magnetic tunnel junction sensor for sensing magnetic transitions from a magnetic recording disk in a magnetic recording disk drive when the read head is connected to sense circuitry, the assembly comprising:
a head carrier having a sensing surface for facing the surface of the disk and a trailing end surface generally perpendicular to the sensing surface;
a first magnetic shield on the trailing end surface of the head carrier, the first shield being electrically conducting for providing an electrical lead for connection to the sense circuitry and magnetically permeable for shielding the sensor from transitions neighboring the transition being sensed;
a first electrically conductive spacer layer on the first shield;
a magnetic tunnel junction sensor on the first spacer layer comprising:
a fixed ferromagnetic layer on the first spacer layer and having its magnetization direction fixed along a preferred direction so as to be substantially prevented from rotation in the presence of an applied magnetic field from the disk;
an insulating tunnel barrier layer located on and in contact with the fixed ferromagnetic layer;
a sensing ferromagnetic layer on and in contact with the tunnel barrier layer and having its magnetization direction oriented generally perpendicular to the magnetization direction of the fixed ferromagnetic layer in the absence of an applied magnetic field and being free to rotate in the presence of an applied magnetic field from the disk;
a second electrically conductive spacer layer on the sensing ferromagnetic layer; and
a second magnetic shield located on the second spacer layer, the second shield being electrically conducting for providing an electrical lead for connection to the sense circuitry and magnetically permeable for shielding the sensor from transitions neighboring the transition being sensed; whereby an electrically conductive path is provided from the first shield to the first spacer layer and through the magnetic tunnel junction sensor to the second spacer layer and the second shield, the path including a path for tunneling current generally perpendicularly through the tunnel barrier layer.

16. The head assembly according to claim 15 further comprising a capping layer for providing corrosion protection for the magnetic tunnel junction, the capping layer being located between the sensing ferromagnetic layer and the second spacer layer.

17. The head assembly according to claim 15 wherein the second spacer layer is a capping layer for providing corrosion protection for the magnetic tunnel junction.

18. The head assembly according to claim 15 further comprising an antiferromagnetic layer in contact with the fixed ferromagnetic layer for fixing the magnetization direction of the fixed ferromagnetic layer by interfacial exchange coupling, the antiferromagnetic layer being located between the first spacer layer and the fixed ferromagnetic layer.

19. The head assembly according to claim 18 further comprising a template layer located on the first spacer layer for enhancing the formation of the antiferromagnetic layer, and wherein the antiferromagnetic layer is located directly on and in contact with the template layer.

20. The head assembly according to claim 18 wherein the first spacer layer is a template layer for enhancing the formation of the antiferromagnetic layer, and wherein the antiferromagnetic layer is formed directly on and in contact with the template layer.

21. The head assembly according to claim 15 further comprising:
a biasing ferromagnetic layer for longitudinally biasing the magnetization direction of the sensing ferromagnetic layer in a direction generally perpendicular to the magnetization direction of the fixed ferromagnetic layer in the absence of an applied magnetic field; and
an electrically insulating layer located between the biasing and sensing ferromagnetic layers for electrically isolating the biasing layer from the sensing layer; and wherein the spacer layers are electrically isolated from the biasing layer by the insulating layer, whereby when a sense current is passed between the first and second shields it passes generally perpendicularly through the magnetic tunnel junction without passing into the biasing layer.

22. The head assembly according to claim 15 further comprising sense circuitry connected to the first and second shields.

23. The head assembly according to claim 15 wherein each of the first and second shields includes a pedestal region, and wherein the first spacer layer is formed on the pedestal region of the first shield and the second spacer layer is formed on the pedestal region of the second shield, whereby the spacing between the first and second shields is greater outside the pedestal regions than at the pedestal regions.

24. The head assembly according to claim 23 wherein the area of each of the pedestal regions is substantially the same as the area of each of the first and second spacer layers.

25. The head assembly according to claim 15 wherein the first and second shields are formed of a material selected from the group consisting of NiFeX alloys (where X is Ta, Rh, Pt, or Nb), CoZrNb alloys, and FeAlSi alloys.

26. The head assembly according to claim 15 wherein the head carrier is an air-bearing slider and wherein the sensing surface is the air-bearing surface of the slider.

* * * * *